United States Patent Office 2,870,171
Patented Jan. 20, 1959

2,870,171

EPOXIDATION PROCESS

Charles M. Gable, Lafayette, Calif., assignor to Shell Development Company, New York, N. Y., a corporation of Delaware No Drawing. Application May 21, 1956
Serial No. 585,923

5 Claims. (Cl. 260—348.5)

This invention relates to the epoxidation of ethylenic compounds and, more particularly, to the production of epoxy compounds by reacting hydrogen peroxide with the corresponding ethylenic compounds.

Commercial production of exoxides is presently limited to two methods, namely, dehydrohalogenation of the corresponding halohydrins or epoxidation of ethylenic compounds by reaction with organic peracids. Both of these methods have disadvantages. The dehydrohalogenation method requires the use of expensive halohydrins while epoxidation with organic peracids, although it has been considerably improved recently through the use of organic peracids formed in situ in the epoxidation mixture, involves complications and expense in the recovery of the product from the organic acid present in the reacted mixture.

An important object of the present invention is the production of epoxidation products by direct reaction of ethylenic compounds with aqueous hydrogen peroxide whereby the foregoing disadvantages of the above-mentioned epoxidation methods are avoided. Another object of the invention is the provision of an advantageous method for the continuous production of epoxides by reacting ethylenic compounds with aqueous hydrogen peroxide. A special object is to provide a new and more economical method for producing glycidol and/or glycerin from allyl alcohol. Still other objects and advantages of the invention will be apparent from the following description of the new method in certain of its particularly useful applications and modifications which are given for purposes of illustration only without being intended to limit the invention.

The invention is based on the discovery that ethylenic compounds can be successfully epoxidized by reaction in the liquid phase with aqueous hydrogen peroxide in the presence of a tungstic acid compound catalyst deposited on an inert solid support. In this new method of operation it is not necessary or usually desirable to use organic acids as solvents or as the source of peracid catalysts or otherwise in the reaction. The expression "tungstic acid compound catalysts" as used herein refers to the tungstic acids and their salts as a class which is described in more detail hereinafter.

From the prior art it would not have been expected that the tungstic acids could be used successfully to produce epoxidation products since they are strong acids which have given only hydroxylation or other types of oxidation products when used in reactions of peroxides with ethylenic compounds, see, for example, Bergsteinsson patent, U. S. 2,373,942.

In such prior methods of reaction with tungstic acid catalyst dissolved or suspended in the reaction mixture instead of deposited on a support according to the present invention, depending on the catalyst concentration and pH at which the reaction is carried out, the tungstic acid appears in the reacted mixture either wholly dissolved or partly in solution and partly in the form of a colloidal sol. There have been two methods of operation generally used in the reaction. The first uses a high catalyst concentration (0.1 to 0.5% w. based on overall feed), and has a reaction time of about 4 to 2 hours. In this case the catalyst must be recovered from the reaction product and recycled to the reactor. The other method involves a catalyst concentration sufficiently low (0.01 to 0.05% w.) to permit discarding the catalyst. The reaction time in this case is about 80 to 20 hours. The recovery of catalyst for recycling greatly increases the cost of operation in the first case, while the long reaction time necessary in the second case involves large capital outlay for reactors and auxiliary equipment which make it also expensive. By the new process of the present invention it is not only feasible to obtain epoxides in substantial yields instead of the polyhydroxy products of the method of Bergsteinsson but also one can successfully operate with short reaction times without any need for recovery and recycle of catalysts and thus achieve lower cost operation even when polyhydroxy compounds are the desired final products of the process.

Hydrogen peroxide brings about rapid desorption of tungstic acid compound catalysts from the porous solids used as supports in the new process due to the conversion of the tungstic acid catalysts to the more highly soluble percompounds. Thus adsorbed tungstic acid reacts with hydrogen peroxide to form pertungstic acid which dissolves in the aqueous medium so it would be predicted that the supported catalyst would soon lose any effectiveness it might have initially in promoting reactions of ethylenic compounds with hydrogen peroxide. It has been found, however, that while such desorption does take place in the process of the invention not only is it relatively small when an ethylenic compound is present in the mixture but also the desorbed catalyst is readsorbed on the porous carrier during the course of the process. As a result the process can be successfully operated without significant loss of catalyst from the support or in any case with losses so small that corresponding very small additions of make-up tungstic acid compound catalyst with the feed are economically practical for maintaining the activity of the supported catalyst substantially constant without recycling catalyst recovered from the reaction products. Only very low concentrations of the tungstic acids are present in the reaction mixture in dissolved form compared to prior methods of operation with these catalysts. This low concentration of acid catalyst results in higher pH values in the reaction medium which are believed to contribute substantially to the fact that epoxides instead of the expected hydroxylation products can be obtained in substantial yields by the use of the catalysts on an inert adsorptive solid support in accordance with the invention.

The tungstic acid compound catalysts which are used in the new process are the tungstic acids which include tungstic acid and the heteropolytungstic acids of which phosphotungstic, arsenotungstic, bismotungstic, molybdotungstic selenotungstic and tellurotungstic acids are examples, and the water-soluble salts of these acids. Alkali metal, ammonium, and alkaline earth metal salts are particularly suitable, the acid salts being the most advantageous form of tungstic acid salt catalysts. Exemplary acid salt catalysts are sodium acid tungstate, ammonium acid phosphotungstate, potassium acid bismotungstate, calcium acid tungstate, sodium acid molybdotungstate, zinc acid stibnotungstate, etc. Neutral salts of the tungstic acids which can also be used are, for instance, sodium tungstate, lithium tungstate, ammonium tungstate, potassium tungstate, magnesium phosphotungstate, and cuprous chromotungstate.

The inert, porous carrier on which the tungstic acid compound catalysts are deposited in preparing supported catalysts for use in the process of the invention is advantageously a material having a porosity greater than 30% on a void-free basis. The porosity, as used herein, relates to interstices or pores of a diameter less than 0.03 millimeter. The adsorptive solids which have been found effective for the pretreatment are thus those which have more than 30% porosity attributable to pores of less than 0.030 millimeter in diameter. The preferred adsorptive solids are those having a porosity between about 45% and about 70%, and most preferably have an average pore diameter of 20 to about 200 Angstrom units. It is also desirable that adsorptive solids used have a surface area of at least 10 square meters per gram, and more preferably from about 50 to 2000 square meters per gram. A number of adsorptive solids meeting these requirements are available. Especially good results have been obtained with adsorptive aluminas. Suitable forms of adsorptive alumina are, for instance, those sold by the Aluminum Company of America as Alorco F–1, F–2, F–11 and F–20 grades of alumina and Harshaw alumina grades A, Al-0104 and Al-0501.

Instead of the adsorptive aluminas, one can use other adsorptive oxides, particularly gels such, for example, as magnesia gels and zirconia gels, or mixtures of such oxdie gels. For instance, alumina-silica gel mixtures containing about 5% silica and having a surface area of about 450 square meters per gram, or the silica-magnesia or silica-zirconia gel cracking catalysts can be used. The gels can be of either the wide pore (about 90 Angstrom units) or the narrow pore (about 20 Angstrom units) type.

Adsorptive clays, particularly the montmorillonite clays which are used in decolorizing lubricating oils, are another type of adsorptive solid which can be employed at catalyst supports in the present process. Geological Survey Bulletin 928C describes adsorptive clays which are thus useful.

Activated carbon is another form of adsorptive solid which has been found to be suitable for use as the catalyst support. The commercial forms of activated charcoal known as Norit and Darco are particularly suitable for this purpose. One can, however, use other forms of carbon produced by destructive distillation of vegetable or animal matter. Those activated by treatment with air, steam or carbon dioxide at elevated temperatures are preferred. Animal charcoals such as those obtained from bones are another source of suitable adsorptive solid support material.

The tungstic acid compound catalyst or mixture of such catalysts can be deposited on the chosen adsorptive solid support material in various ways. One advantageous method comprises saturating the porous support with an aqueous solution of the catalyst, as by immersion or the like, and drying the saturated support, for instance with warm air, preferably after draining off any excess catalyst solution present. The process can be repeated one or more times to increase the amount of adsorbed tungstic acid compound on the carrier but usually a single saturation and drying cycle is sufficient. The amount of deposited catalyst on the support can be controlled by regulating the concentration of the aqueous solution of catalytic tungstic acid compound which is employed. It is usually advantageous to deposit about 50 to about 300 grams of free tungstic acid per liter of carrier. This corresponds to about 50 to about 300 grams of tungstic acid per kilogram of the preferred activated alumina carrier. Other tungstic acid compound catalysts should be used in molar equivalent amounts on the support. Thus when using sodium acid tungstate as the catalyst about 60 to about 300 grams are used per liter of support while about 30 to about 200 grams of phosphotungstic acid are used per liter of support or about 70 to about 400 grams per kilogram of activated carbon support, for instance. With lower amounts of deposited tungstic acid compound catalyst the yields of desirable product are adversely effected and with substantially larger amounts it is difficult to avoid excessive loss of catalyst from the reaction system.

The new process is advantageously conducted at temperatures of the order of about 0° to about 80° C., preferably about 50° to about 70° C., under sufficient pressure to maintain the reactants substantially in the liquid phase. While stoichiometric proportions of ethylenic compound and hydrogen peroxide, that is, one mole of peroxide per double bond which is to be reacted in the starting ethylenic compound, or an excess of either reactant can be employed, it is generally preferred to use about 1 to about 4 moles of monoethylenic starting compound per mole of hydrogen peroxide and proportionately higher proportions when polyepoxy products are to be produced from polyethylenic compounds.

Aqueous hydrogen peroxide of a wide range of concentrations can be used in the process, solutions of about 15% to 90% being usable. However, for high yields of epoxide products it is desirable to employ solutions such that the mole ratio of water to ethylenic compound in the initial reaction mixture is not greater than about 75:1 and preferably is of the order of about 10:1 to about 50:1. Under these conditions using a weight of tungstic acid compound catalyst, exclusive of the weight of the carrier employed, of about 0.5% to 5% of the reaction mixture, reaction times of about 1½ to about 4 hours have been found to give good yields without substantial loss of catalyst from the support. Excessive reaction times should be avoided where the epoxide is the desired product since prolonged contact of the epoxide with an acidic aqueous medium leads to hydration of the epoxide ring.

The process can be carried out in a number of different ways. One convenient method of batch reaction comprises contacting the ethylenic compound to be epoxidized with aqueous hydrogen peroxide under the previously indicated conditions in the presence of the supported catalyst in finely divided form while stirring to keep the catalyst suspended and provide good contact with the reactants. Advantageously the peroxide is added preferably slowly over a period of time to a slurry of the catalyst in the ethylenic compound or a solution thereof in an inert solvent and the stirring is continued for a period after completion of the hydrogen peroxide reaction to insure substantially complete readsorption of any desorbed catalyst. The catalyst can then be readily removed from the reacted mixture by settling and decantation or filtration and reused in a subsequent batch while the product is recovered as the epoxide or after conversion to a desired derivative by any of the known methods. The process can be made continuous by feeding the suspension of supported catalyst in the ethylenic compound continuously through a reactor which can be a stirred vessel or a reaction coil through which the mixture is passed at a sufficient rate to prevent settling out of the catalyst. A heating jacket or other temperature control means is used to regulate the temperature of the reaction mixture. The hydrogen peroxide is added continuously at one or more points, preferably a plurality of points along the path of flow of the reaction mixture. After the required period of contact, the reacted mixture is withdrawn continuously and the catalyst separated and recycled and the product recovered as previously indicated.

The most advantageous method of operation, however, has been found to be passage of the reaction mixture through a stationary bed of supported tungstic acid compound catalyst. In this modification of the process there is a tendency for the catalyst to migrate in the direction of flow of the reaction mixture. A feature of the present invention is the provision of a method for preventing appreciable loss of catalyst with the product when using this preferred modification. It has been found that this can be accomplished efficiently by passing the reaction mixture through successive zones of the porous support material having deposited thereon different amounts of the chosen catalytic tungstic acid compound and periodically reversing the direction of flow of the reactants through these zones. In a later zone in the direction of flow obtaining there is maintained a lower proportion of catalyst to support material than exists in a preceding zone, so that it absorbs catalyst from the outgoing feed. An intermediate zone of the series in the preferred method of operation will contain the previously indicated proportion of catalytic tungstic acid compound to support material and the chief reaction will take place therein.

The reactor in this modification can consist of a single vessel which can advantageously be packed initially with layers of porous support material free from catalyst at each end of the bed of supported catalyst. These end zones of adsorbent material alternately absorb the small amount of catalyst leaving the chief reaction zone and give it up again to the feed stream for redeposition in the intermediate zone when the direction of flow of the reaction mixture is reversed. Instead of employing a single vessel comprising the different zones, several vessels can be employed in series, each vessel comprising one or more of the zones.

When using the preferred method of reaction with a fixed bed of catalyst deposited on a support, it is desirable to use support material in a finely divided form which favors efficient reaction with minimum loss of deposited catalyst, but is not so fine as to cause excessive pressure drop through the bed. Supports of mesh size of about 20 to 200, can be used. More advantageously, supports of about 60 to 200 mesh are employed because of their greater effectiveness in reducing loss of deposited catalytic tungstic acid compound from the system. Finer mesh supports can be used when employing the supported catalyst as a slurry or suspension in the reaction mixture, but the mesh should not be so fine as to make separation of the catalyst from the reacted product too difficult. Supports of about 20 to 400 mesh are suitable.

It is not essential that the process be operated so that there is no loss of catalytic tungstic acid compound from the supported catalyst during the reaction and under some conditions it may be desirable to carry out the reaction under conditions at which some of the catalyst compound is taken off with the outgoing reacted mixture since higher throughput rates can usually be obtained under such conditions. In this method of operation an equilibrium concentration of catalytic tungstic acid compound in the reaction bed can be maintained readily by small additions of the catalyst compound with the feed and without need for recovery and recycling of catalyst from the product.

The invention is further illustrated by the following non-limiting examples.

Example I

This example illustrates batch methods of reaction according to the invention. Two catalysts consisting of tungstic acid supported on different grades of activated alumina produced by the Aluminum Company of America, "Alorco F-20" of 80-200 mesh and "Alorco F-1" of 20-40 mesh size were prepared by immersing the aluminas in an aqueous solution of tungstic acid of 0.5% concentration for a period of about 60 minutes and draining off the excess solution. The catalysts containing 166 grams of tungstic acid per kilogram of alumina were used in a series of runs carried out in a stirred reactor at 60° C. under the following conditions of batch reaction:

Allyl alcohol:hydrogen peroxide mole ratio_____ 1.5:1
Water:hydrogen peroxide mole ratio_____ 35:1
Weight of supported catalysts per kilogram of reaction mixture_____grams__ 112

The runs were carried out at different starting pH values for the reaction mixtures obtained by adding varying amounts of sodium hydroxide to the mixture. The following results were obtained:

|  | Catalyst Support | | | |
| --- | --- | --- | --- | --- |
|  | F-20 | F-20 | F-1 | F-1 |
| pH at start of reaction | 4.8 | 5.8 | 5.0 | 5.6 |
| Reaction time (hours) | 4 | 1.5 | 4 | 4 |
| Hydrogen peroxide conversion (percent) | 97.8 | 98.4 | 99.1 | 99.1 |
| Glycidol yield (mole percent) based on H₂O₂ applied | 31 | 27 | 27 | 30 |
| Tungstic acid in the reacted solution (p. p. m.) | 7 | 26 | 3 | 3 |

The glycidol produced can be recovered as reaction product or can be converted to glycerine without separating it from the reaction mixture which also contains glycerine simultaneously produced during the epoxidation. Thus by hydrating the glycidol by boiling the epoxidation mixture at atmospheric pressure for 2 to 4 hours the following results were obtained:

|  | Catalyst Support | | | |
| --- | --- | --- | --- | --- |
|  | F-20 | F-20 | F-1 | F-1 |
| pH at start of reaction | 4.8 | 5.8 | 5.0 | 5.6 |
| Glycerol yield after hydration Based on H₂O₂ applied (Percent) | 77 | 66 | 77 | 75 |

Under the same reaction conditions when using methallyl alcohol and crotyl alcohol instead of allyl alcohol, good yields of 2-methyl glycidol and 2,3-epoxybutanol, respectively, are obtained.

Example II

Batchwise epoxidation of 1,4-butene-2-diol is illustrated by this example.

A catalyst consisting of sodium acid tungstate (NaHWO₄) deposited on "Norit A" activated charcoal is prepared by immersing the 40-80 mesh charcoal particles in a solution of sodium acid tungstate made by adding 1.1 moles of aqueous sodium hydroxide to 1 mole of tungstic acid (pH of mixture 6.6), draining off the excess solution and drying in warm air, to obtain a catalyst containing about 230 grams per liter.

This catalyst is used in the proportions of about 100 ml. per kilogram of reaction mixture (equivalent to 23 grams of NaHWO₄ per kilogram of reaction mixture) in the reaction of the butenediol with 35% aqueous hydrogen peroxide, in a mole ratio of 1.1:1 at 50° C. After a reaction time of two hours with vigorous stirring the catalyst is filtered off and the water stripped off under vacuum at 50° C. From the crude bottom residue (77% epoxide) there is obtained by crystallization from methyl ethyl ketone and extraction of the crystals and recrystallization from the same solvent, 2,3-epoxybutane-1,4-diol of 95% purity boiling, M. P. 52°-53° C., epoxide value 0.92 equivalent per 100 grams.

Similar good results are obtained when using neutral sodium tungstate deposited on activated alumina as the catalyst in the production of 2-methyl-2,3-epoxypentanone-4 from mesityl oxide and ethylene glycol monoepoxypropionate from ethylene glycol monoacrylate under analogous conditions.

Example III

In this example continuous reaction in a fixed bed of supported catalyst is illustrated.

A catalyst prepared by immersing adsorptive alumina, mesh size 20-40, in an aqueous tungstic acid solution of 0.5% concentration, and draining to obtain a catalyst containing 83 grams per kilogram of alumina, was packed in a vertical reactor provided with a heating jacket and inlet and outlet connections at the top and bottom respectively. The reactor was packed with 93 grams of catalyst per liter of reaction space and was operated at 60° C. A feed stream containing 11.5% allyl alcohol, 4.34% hydrogen peroxide and 84.2% water, by weight, was pumped through the catalyst bed at a liquid hourly space velocity of 0.6. After 1.4 volumes of feed per bed volume had been reacted the conversion of hydrogen peroxide was 78% and the yield of glycidol plus glycerine was about 80% based on the allyl alcohol converted.

After passage of 3.6 bed volumes of feed through the reactor the loss of tungstic acid in the effluent was 290 p. p. m. For comparison, a similar single-stage run was made with 290 p. p. m. of tungstic acid in the feed but without a fixed bed. The peroxide conversion at the same temperature and flow rate was only one-fifth that obtained at the same catalyst loss rate when using the fixed bed of supported catalyst.

With the reactor packed first with the same alumina which had not been impregnated to form a bed of about 50% the volume of the catalyst bed, then with the tungstic acid-impregnated alumina and finally with another layer of unimpregnated alumina of the same volume as the first, the loss of tungstic acid from the reactor can be reduced to less than 10 p. p. m. without reducing the yield or conversion, by reversing the direction of flow of the reaction mixture through the beds when the tungstic acid content of the effluent stream reaches this value.

The same good results are obtained when calcium acid tungstate deposited on adsorptive alumina is used as the intermediate catalyst bed in the reactor under these conditions.

The foregoing examples are merely illustrative of the invention which can be carried out successfully with ethylenic compounds generally, that is with any compound having an ethylenic double bond between two carbon atoms in an aliphatic or cycloaliphatic group. Thus in addition to the specific ethylenically unsaturated compounds mentioned in these examples, other aliphatic, cycloaliphatic and aryl-substituted aliphatic and cycloaliphatic ethylenic compounds can be used in the new process. It is particularly valuable for reactions of hydrogen peroxide with ethylinic hydroxy compounds, especially beta,gamma-ethylenic alcohols and polyols, not only because the products are quite valuable but also because the process of the invention is particularly effective in minimizing the undesirable side reactions to which this type of starting ethylenic compound is especially susceptible in reactions with hydrogen peroxide. Typical examples of this preferred type of starting ethylenic compound other than those of the foregoing examples are, for instance, allyl carbinol, methyl vinyl carbinol, dimethyl allyl carbinol, oleyl alcohol, citronellol, geraniol, linalool, cyclohexenol, the terpineols, cinnamyl alcohol, and related mono- and polyolefinic mono- and polyhydroxy alcohols. The water-soluble ethylenic compounds, especially the water-soluble ethylenic alcohols and diols, are particularly advantageous starting compounds for the new process. Other specific examples of compounds which can be thus epoxidized successfully include the olefinic hydrocarbons such as 2-butene, isobutylene, the amylenes, 2-octene, 3-decene, dodecenes from propylene polymerization, cyclopentene, cyclohexene, 4-methyl cyclohexene and the like; ethylenic ethers of the foregoing ethylenic alcohols which may be the simple ethers or mixed ethers with either saturated or unsaturated alcohols, as well as vinyl ethers, for example, methyl vinyl ether, allyl vinyl ether, isopropyl isopropenyl ether, isocrotyl butyl ether, methyl cyclohexenyl ether, ethyl oleyl ether, methallyl cinnamyl ether, etc. Ethylenic esters which can be esters of ethylenic acids with saturated or unsaturated alcohols or esters of the previously mentioned ethylenic alcohols with carboxylic acids constitute another class of ethylenic starting compounds with which the present process is especially useful. Examples of suitable esters are, for instance, ethyl methacrylate, propyl crotonate, allyl crotonate, allyl acetate, oleyl acetate, cyclohexyl acrylate, diethyl maleate, oleyl cinnamate, ethyl linoleate, unsaturated fatty acid glycerides, and the like. Other ethylenic carbonyl compounds can also be epoxidized in accordance with the invention, for example, methyl vinyl ketone, methyl allyl ketone, ethyl isopropenyl ketone, mesityl oxide, phorone, isophorone, methyl cyclohexenyl ketone, vinyl phenyl ketone, crotonaldehyde, cintronellol, the cyclocitrals, ionone, cinnamyl aldehyde, etc. Ethylenic halides such as crotyl chloride, methallyl chloride and the like are another type of ethylenic compound which can be successfully epoxidized by the new method. When epoxidizing water-insoluble ethylenic compounds it is advantageous to use a mutual solvent for the ethylenic compound and the aqueous hydrogen peroxide solution used. Water-soluble tertiary alcohols are particularly useful mutual solvents for this purpose. Thus, for example, in epoxidizing "Aldrin" (1,2,3,4,10,10-hexachloro-1,4,4$a$,5,8,8$a$-hexahydro-1,4,5,8-endo,exodimethanonaphthalene) to produce the insecticide "Dieldrin" (1,2,3,4,10,10 - hexachloro - 6,7-epoxy - 1,4,4$a$,5,6,7,8,8$a$ - octahydro - 1,4,5,8-endo,exo-dimethanonaphthalene) it has been found that it is advantageous to use tertiary butyl alcohol as the inert mutual solvent for the reactants. The preferred ethylenically unsaturated starting compounds are the neutral compounds having three to about eighteen carbon atoms per molecule.

The invention will thus be seen to be capable of wide variation not only with respect to the ethylenic compounds which can be successfully reacted and the supported tungstic acid compound catalysts which are effective in promoting the reaction, but also in regard to the method of carrying out the new process in its various modifications. The invention is therefore not limited to the examples which have been given nor by any theory proposed in explanation of the improved results which are obtained.

I claim as my invention:

1. In a process for reacting an ethylenic compound with hydrogen peroxide under the catalytic influence a member of the group consisting of tungstic acid heteropolytungstic acid and salts of said acids at about 0° to about 80° C. using about ¼ to about 1 mole of hydrogen peroxide per mole of ethylenic unsaturation to be epoxidized and not more than about 75 moles of water per mole of ethylenic compound, the improvement which comprises passing said reactants in the liquid phase into contact with said catalyst deposited on a solid inorganic adsorbent carrier having a porosity greater than 30% on a void-free basis, an average pore diameter of 20 to about 200 Angstrom units, and a surface area of at least ten square meters per gram, thereafter contacting the reaction mixture with said solid adsorbent carrier whereby tungstic acid in solution is adsorbed thereon, and periodically reversing the flow of reaction mixture through said carrier whereby the thus adsorbed tungstic acid on said carrier as at least a portion of the catalyst for said reaction.

2. In a process for producing epoxidation products wherein the corresponding beta,gamma-ethylenic hydroxy compound is reacted in the liquid phase with hydrogen peroxide at about 0° to about 80° C. under the catalytic influence of tungstic acid using about ¼ to about 1 mole of hydrogen peroxide per mole of ethylenic unsaturation to be epoxidized and not more than about 75 moles of water per mole of ethylenic compound, the improvement which comprises passing the reaction mixture through a bed of substantially inert porous solid inorganic support material having a porosity greater than 30% on a void-free basis, an average pore diameter of 20 to about 200 Angstrom units, and a surface area of at least ten square meters per gram impregnated with at least 0.5% by weight of said mixture of said tungstic acid catalyst, periodically reversing the direction of flow of the reactants whereby an intermediate zone of said bed contains at least 50 grams of adsorbed tungstic acid per kilogram of support material, and a later of said zones, in the direction of flow contains a lower proportion of catalyst to support material so that it absorbs catalyst from the outgoing reaction mixture.

3. In a process for epoxidizing a beta,gamma-monoethylenic alcohol by reaction with hydrogen peroxide at about 0° to about 80° C. under the catalytic influence of tungstic acid using about ¼ to about 1 mole of hydrogen peroxide and not more than about 75 moles of water per mole of ethylenic alcohol, the improvement which comprises passing the reaction mixture through a bed of said catalyst on a granular adsorptive alumina support material having a porosity greater than 30% on a void-free basis, an average pore diameter of 20 to about 200 Angstrom units, and a surface area of at least ten square meters per gram after passage through a bed of said granular support material containing a lesser amount of said catalyst, conducting the effluent from said bed of supported catalyst through another bed of said granular alumina support material containing a lesser amount of said catalyst such that it absorbs catalyst from the outgoing reaction mixture and periodically reversing the direction of flow of the reaction mixture through said series of three beds.

4. A process in accordance with claim 3 wherein glycidol is produced by contacting allyl alcohol with tungstic acid deposited on adsorptive alumina.

5. A process in accordance with claim 4 wherein the pH of the reaction mixture is adjusted to about 4 to about 6 by addition of a base.

References Cited in the file of this patent

UNITED STATES PATENTS

| | | |
|---|---|---|
| 2,312,535 | Fieser | Mar. 2, 1943 |
| 2,373,942 | Bergsteinsson | Apr. 17, 1945 |
| 2,414,385 | Milas | Jan. 14, 1947 |
| 2,543,419 | Niederhauser | Feb. 27, 1951 |
| 2,613,223 | Young | Oct. 7, 1952 |
| 2,754,325 | Smith | July 10, 1956 |
| 2,776,301 | Payne et al. | Jan. 1, 1957 |
| 2,786,854 | Smith et al. | Mar. 26, 1957 |

OTHER REFERENCES

Shanley et al.: Ind. and Eng. Chem., vol. 39, pp. 1536–53 (1947).